United States Patent
Sridhar et al.

(10) Patent No.: US 7,391,777 B2
(45) Date of Patent: Jun. 24, 2008

(54) DISTANCE-SENSITIVE SCHEDULING OF TDM-OVER-PACKET TRAFFIC IN VPLS

(75) Inventors: Kamakshi Sridhar, Plano, TX (US); Taeho Kim, Dallas, TX (US)

(73) Assignee: Alcatel Lucent, Paris (FR)

( * ) Notice: Subject to any disclaimer, the term of this patent is extended or adjusted under 35 U.S.C. 154(b) by 802 days.

(21) Appl. No.: 10/700,023

(22) Filed: Nov. 3, 2003

(65) Prior Publication Data

US 2005/0094645 A1    May 5, 2005

(51) Int. Cl.
H04L 12/28 (2006.01)
H04L 12/56 (2006.01)
H04L 12/54 (2006.01)

(52) U.S. Cl. .............................. 370/395.21; 370/395.42; 370/413

(58) Field of Classification Search ............ 370/395.21, 370/395.42, 412, 238, 413, 428, 429
See application file for complete search history.

(56) References Cited

U.S. PATENT DOCUMENTS

| | | | |
|---|---|---|---|
| 5,793,976 A * | 8/1998 | Chen et al. ................... 709/224 |
| 6,226,266 B1 * | 5/2001 | Galand et al. ................ 370/235 |
| 6,233,429 B1 * | 5/2001 | Soffer et al. ............... 455/12.1 |
| 9,546,013 * | 4/2003 | Huang et al. ............. 370/395.1 |
| 6,594,268 B1 * | 7/2003 | Aukia et al. ................. 370/400 |
| 6,956,821 B2 * | 10/2005 | Szviatovszki et al. ........ 370/237 |
| 2002/0018468 A1 * | 2/2002 | Nishihara .................... 370/389 |
| 2002/0085565 A1 | 7/2002 | Ku et al. |
| 2002/0150115 A1 * | 10/2002 | Onvural et al. ............... 370/411 |
| 2003/0072270 A1 * | 4/2003 | Guerin et al. ............... 370/254 |
| 2003/0091070 A1 | 5/2003 | Pail et al. |
| 2003/0154328 A1 * | 8/2003 | Henderson et al. ............. 710/1 |
| 2003/0202517 A1 * | 10/2003 | Kobayakawa et al. ..... 370/395.4 |
| 2003/0219014 A1 * | 11/2003 | Kotabe et al. ................ 370/375 |
| 2004/0105391 A1 * | 6/2004 | Charcranoon ............... 370/252 |
| 2004/0153564 A1 * | 8/2004 | Lakkakorpi .................. 709/232 |
| 2006/0271704 A1 * | 11/2006 | Chan et al. ................... 709/240 |

OTHER PUBLICATIONS

Cell discarding policies supporting multiple delay and loss requirements in ATM networks—Yinggang Xie; Tao Yang; Global Telecommunications Conference, 1997. GLOBECOM '97., IEEE Vol. 2, Nov. 3-8,1997 pp. 1075-1080 vol. 2 Digital Object Identifier 10.1109/GLOCOM.1997.638492.*

SWIFT—Simple Weighted Integration of Differentiated Traffic—Dumitrescu A.; Harju J; Tampere University of Technology, Institute of Communications Engineering; May 8, 2003: http://www.cs.tut.fi/tlt/npg/icefin/documents/SPECTS2002-cr.pdf.*

(Continued)

Primary Examiner—Seema S. Rao
Assistant Examiner—Xavier Wong

(57) ABSTRACT

A method of scheduling high-priority packets in a metro Ethernet switch is described. In one embodiment, the method comprises the steps of determining a maximum queuing delay allowed for at least two high-priority packets in an output queue in the switch; determining which one of the at least two high-priority packets has the smallest maximum queuing delay allowed; and scheduling the one of the at least two high-priority packets determined to have the smallest maximum queuing delay allowed before the remaining ones of the at least two high-priority packets.

25 Claims, 3 Drawing Sheets

OTHER PUBLICATIONS

K. Kompella et al.; "Decoupled Virtual Private LAN Services"; Network Working Group, Internet Draft; Oct. 2003; 16 pages; www.ietf.ort/internet-drafts/draft-kompella-ppvpen-dtls-03.txt.

Marc Lasserre et al.; "Virtual Private LAN Services over MPLS"; Internet Draft Document, Provider Provisioned VPN Working Group; Mar. 2003; 26 pages; www.draft-lasserre-vkompella-ppvpn-vpls-04.txt.

Yinggang Xie, et al, "Cell discarding Policies Supporting Multiple Delay and Loss Requirements in ATM Networks", Global Telecommunications Conference, 1997. Globecom '97., IEEE Phoenix, AZ, USA Nov. 3-8, 1997, New York, NY, USA, IEEE, US, vol. 2, Nov. 3, 1997, pp. 1075-1080, XP010254727.

Mammeri Z: "Delay Jitter Guarantee for Real-Time Communications with ATM Network", ATM 1999. ICATM '99. 1999 2nd International Conference on Colmar, France Jun. 21-23, 1999, Piscataway, NJ, USA, IEEE, US< Jun. 21, 1999, pp. 146-155, XP010346202.

Srinivasan S H: "TTL Routing for VoIP Congestion Reduction" Communication Systems, 2002. ICCS 2002. The 8th International Conference on Nov. 25-28, 2002, Piscataway, NJ, USA, IEEE, vol. 1, Nov. 25, 2002, pp. 524-528, XP010629273.

* cited by examiner

DISTANCE-SENSITIVE SCHEDULING OF TDM-OVER-PACKET TRAFFIC IN VPLS

BACKGROUND OF THE INVENTION

1. Technical Field of the Invention

The present invention generally relates to transmission of Time Division Multiplex ("TDM") traffic over packet switched networks in Virtual Private LAN Service ("VPLS"). More particularly, and not by way of any limitation, the present invention is directed to method and apparatus for distance-sensitive scheduling of such high-priority traffic.

2. Description of Related Art

Time Division Multiplex ("TDM") technology has been prevalent for a long time; however, the technology for transmitting TDM traffic over packet networks is relatively new. Accordingly, there are few solutions that address the problem of delay for TDM traffic when it is sent over a packet network. One solution addresses the delay that results from sending a large TDM packet over a packet network using a common switch fabric resource for TDM and packet switching. In particular, large packets or data streams are divided into smaller portions upon entering a switch. Each portion is assigned a high priority for transmission and a tracking header for tracking it through the switch. Prior to exiting the switch, the portions are reassembled into the data stream. This technique of providing "cut-through" using a store-and-forward switch mechanism reduces transmission delay and buffer over-runs that would otherwise occur in transmitting large packets or data streams. This solution strictly addresses the problem of sending only large TDM packets and does not address the specific problem of prioritizing between traffic from multiple TDM streams in a VPLS network.

Another solution involves the use of a multi-port link interface module that terminates two or more high-speed TDM links and generates internal data. Data received on one high-speed communications link is combined with the internal data used to fill outbound time slots in an outgoing high-speed link. This solution fails to address the issues of delay when sending TDM traffic over a packet network.

Currently, TDM traffic, such as voice, when sent over a packet network may suffer unacceptable delay and jitter due to multiplexing with packet data. The benefits of low cost and high bandwidth utilization of packet data networks may be offset by the poor performance of TDM traffic when sent over packet networks.

Existing traffic scheduling mechanisms that prioritize one class of traffic over another do not address the problem because all TDM traffic belongs to a single high-priority traffic class. Existing methods do not preferentially prioritize traffic within a class.

SUMMARY OF THE INVENTION

One embodiment is a method of scheduling high-priority packets in a metro Ethernet switch. The method comprises the steps of determining a maximum queuing delay allowed for at least two high-priority packets in an output queue in the switch; determining which one of the at least two high-priority packets has the smallest maximum queuing delay allowed; and scheduling the one of the at least two high-priority packets determined to have the smallest maximum queuing delay allowed before the remaining ones of the at least two high-priority packets.

Another embodiment is a method of scheduling high-priority packets in a metro Ethernet switch. The method comprises the steps of creating a first table that lists, for each high-priority packet that has entered the switch, a position of the high-priority packet in a queue of the switch, a time the high-priority packet entered the queue, and an intended destination of the high-priority packet; creating a second table for storing a maximum allowed queuing delay for each of several possible intended destinations; and using the first and second tables to determine the maximum queuing delay allowed for each of the high-priority packets in the queue of the switch.

Another embodiment is an apparatus for scheduling high-priority packets in a metro Ethernet switch. The apparatus comprises means for determining a maximum queuing delay allowed for at least two high-priority packets in a queue in the switch; means for determining which one of the at least two high-priority packets has the smallest maximum queuing delay allowed; and means for scheduling the one of the at least two high-priority packets determined to have the smallest maximum queuing delay allowed before the remaining ones of the at least two high-priority packets.

Another embodiment is a packet switch comprising a queue containing a plurality of packets received at the switch; and a scheduler for scheduling transmission of the packets in the queue, wherein when the queue contains at least two high-priority packets, the scheduler schedules the one of the at least two high-priority packets determined to have a smallest maximum queuing delay allowed before the remaining ones of the at least two high-priority packets.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
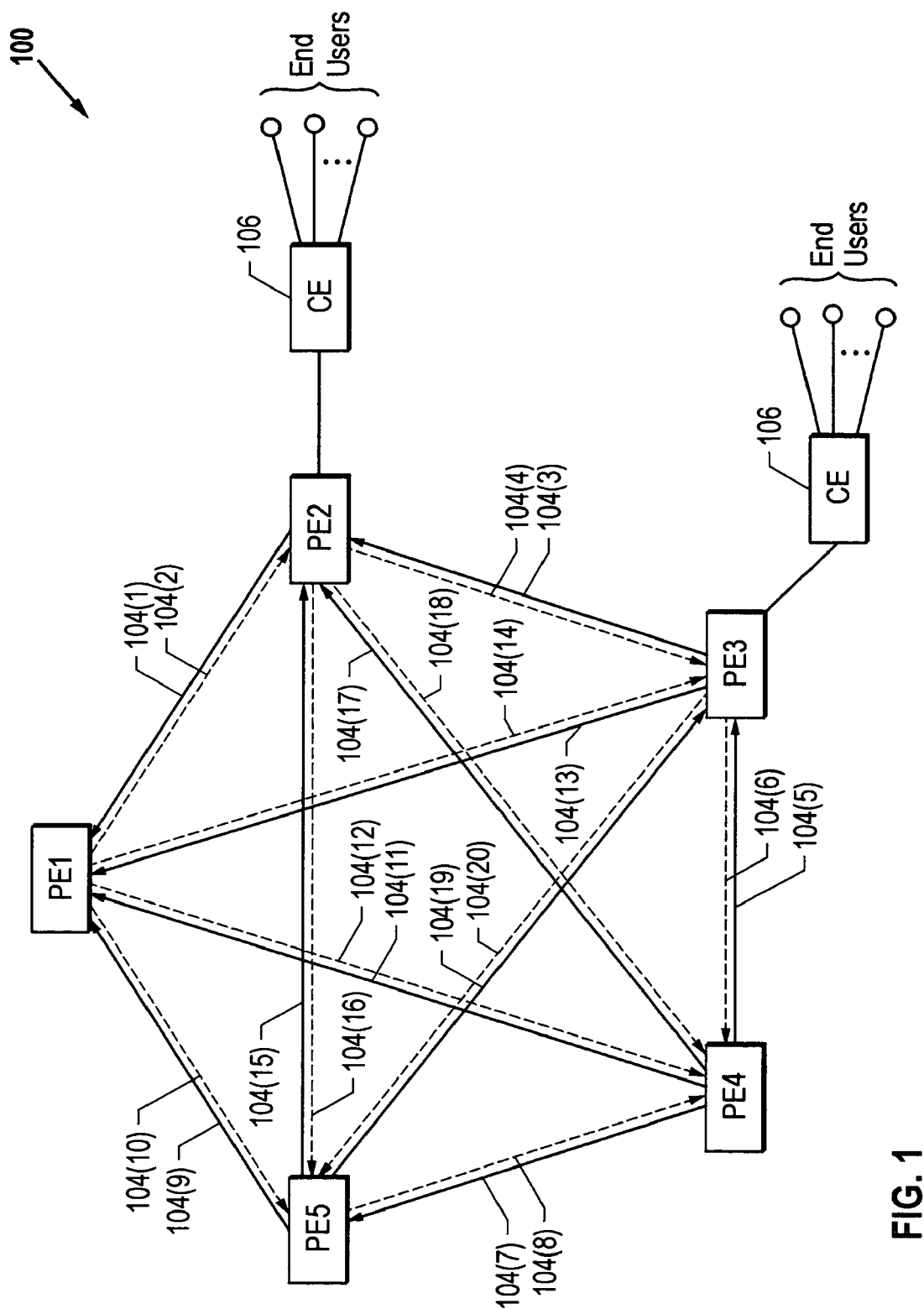
FIG. 1 is a block diagram of a VPLS network with a fully-connected label switched path ("LSP") mesh.

In the drawings, like or similar elements are designated with identical reference numerals throughout the several views thereof, and the various elements depicted are not necessarily drawn to scale. It will be appreciated that the inventive concepts described herein are applicable to any VPLS network; however, representative values for delay, etc., have been selected to illustrate those concepts.

FIG. 1 illustrates a VPLS network with a fully connected LSP mesh, designated in FIG. 1 by a reference numeral 100. The VPLS network 100 comprises N provider edge ("PE") nodes, represented by five nodes PE1-PE5, fully interconnected by an LSP mesh comprising $N \times (N-1)$ point-to-point LSPs 104(1)-104(20). TDM traffic may be carried on one or more of the LSPs 104(1)-104(20) as a component of high-priority traffic. The actual values for the delay requirements of such traffic may vary.

Although not shown in FIG. 1, it will be recognized that there may be intermediate nodes, in particular, provider ("P") nodes, disposed along the LSPs between the PE nodes PE1-PE5. Accordingly, packets destined for different destinations will have to go through a number of hops from ingress PE node to egress PE node. For example, a packet from the node PE1 to the node PE2 may traverse three intermediate P nodes, making the LSP 104(2) a three-hop path; a packet from the node PE1 to the node PE3 may traverse seven intermediate nodes, making the LSP 104(14) a seven-hop path. As a result of this, packets will undergo different delays depending on which LSP 104(1)-104(20) they traverse through the network 100. This situation could be detrimental in the case of packetized TDM traffic or any traffic that is highly sensitive to delay and jitter.

Customer edge ("CE") nodes, represented in FIG. 1 by CE nodes 106, are connected to PE nodes for connecting end users to the network 100.

In the scenario described herein where the VPLS network 100 is actually built using an Ethernet switch, a high-priority queue at the node PE1, for example, will have TDM packets that are destined for the node PE2 via the LSP 104(2) (a three-hop path) and packets that are destined for the node PE3 via the LSP 104(14) (a seven-hop path). Hence, the two packets will experience different delays from network ingress to network egress.

It will be assumed that all of the nodes PE1-PE5 have input queuing. Packets are queued at the input buffers before being scheduled. It will be further assumed that in the illustrated example, there is head-of-the-line blocking and to avoid that, each queue at a node PE1-PE5 is capable of performing an n-packet look-ahead to schedule the packets that may be blocked behind another packet. In one embodiment, this architecture is implemented at the Ethernet switch and n is equal to four. The packetized TDM traffic will be treated as high-priority traffic and will be placed into a high-priority queue.

The basic solution described herein is to introduce an additional prioritization, referred to herein as "relative prioritization", which is valid only within the high-priority class of traffic. This relative prioritization pertains to the number of hops the packet will traverse and hence the delay that the packet will incur. For instance, packets that are destined for nodes that are many hops away will be given priority in transporting them through the high-priority input queue. The information concerning the number of hops is readily available through the VPLS model. Accordingly, this technique should enable equalization of the delay among packets going to different destinations and therefore will enable packets that need to travel many hops to meet their delay and jitter specifications. It should be emphasized that the implementation is pertinent only to the Ethernet switch and since there is no signaling or encapsulation involved, it does not require standardization efforts.

Figure 2:
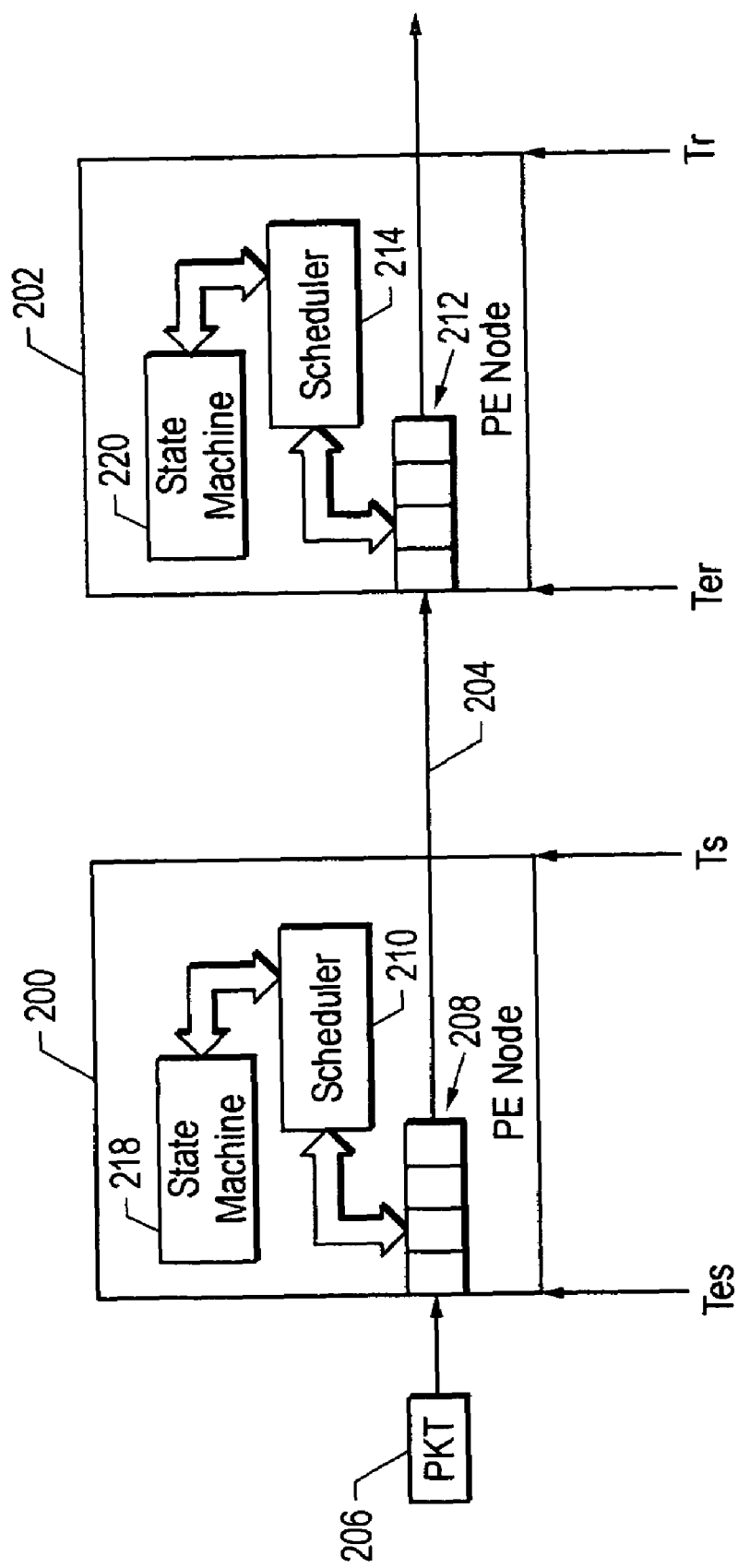
FIG. 2 illustrates the concept of transmission and propagation delay between two provider edge ("PE") nodes of a VPLS network.

Referring now to FIG. 2, two PE nodes 200, 202, connected by a single link 204 with no P nodes therebetween will be considered. $T_{es}$ is the time at which a high-priority packet 206 enters an ingress buffer 208 of the sending node, e.g., the PE node 200; $T_s$ is the time at which the packet 206 is serviced by a scheduler 210 of the sending node 200; $T_{er}$ is the time at which the packet 206 enters an ingress buffer 212 of the receiving PE node 202; and $T_r$ is the time at which the packet 206 is serviced by a scheduler 214 of the receiving node 202. By definition, the total delay ("$T_t$") experienced by a packet 206 from ingress to egress is:

$$T_r - T_{es} = (T_r - T_{er}) + (T_{er} - T_s) + (T_s - T_{es})$$

where $(T_r - T_{er})$ is the queuing delay at the receiving node 202; $(T_{er} - T_s)$ is the transmission plus propagation delay via the link 204; and $(T_s - T_{es})$ is the queuing delay at the sending node 200.

Each node 200, 202, also includes a state machine 216, 218, respectively, for maintaining the state of two tables, i.e., a POS table and a Qmax table, which are described in detail below.

For a given LSP, the queuing delay is calculated by subtracting the transmission delay and the propagation delay from the total allowed delay estimate. This calculation is performed just once at the time of VPLS setup and is a simple calculation to perform.

There are certain constraints unique to TDM traffic transported over a VPLS network. First, the end-to-end maximum delay allowed for TDM traffic is 15 ms. This includes CE-PE, PE-PE, and PE-CE delays. The CE-PE and PE-CE delays will simply be propagation delays; that is, 5 μs/km. The PE-PE delays are as described above and will consist of queuing delays and transmission and propagation delays. Of these, the transmission and propagation delay can be estimated with close accuracy for a given point-to-point link with a given number of hops in between. Thus, the total end-to-end delay is known for each LSP. Second, TDM traffic is carried on point-to-point LSPs. Third, as previously noted, each PE node, such as the nodes PE1-PE5, has an input buffering scheme; that is, packets are queued at the input buffers before being scheduled. Finally, to avoid head-of-line blocking, each queue at a node, be it a PE node or a P node, is capable of an n-packet look-ahead to schedule packets that may be blocked behind a packet. Look-ahead is performed only when needed.

It will be assumed that the distance between PEs is proportional to the number of hops in between, although any other measure of distance, such as a knowledge of the actual distance, might be used.

Figure 3:
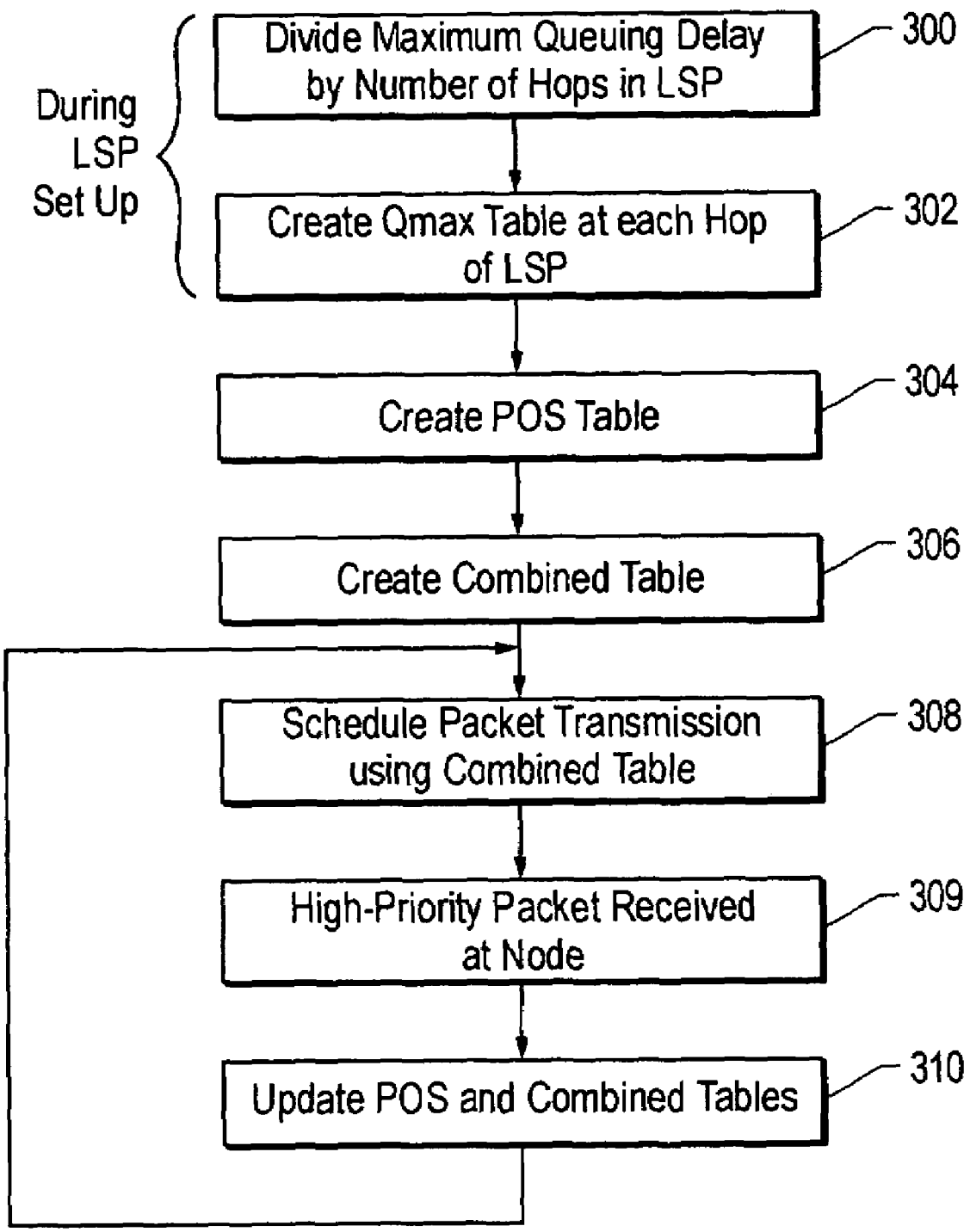
FIG. 3 is a flowchart of the operation of one embodiment for performing distance-sensitive scheduling of TDM-over-packet traffic in VPLS.

FIG. 3 is a flowchart of the operation of one embodiment. In step 300, the maximum queuing delay allowed for a high-priority packet is divided into the number of hops the packet must traverse through the network. For example, assuming the total maximum queuing delay allowed is 12 ms, based on a total end-to-end delay allowed of 15 ms less 3 ms for the propagation and transmission delay for an average size packet. Assuming further that the packet will traverse three hops from source PE to destination (egress) PE, the total number of hops is equal to the number of P hops plus the ingress PE plus the egress PE, or five. Accordingly, the maximum queuing delay, on average, at each hop should not exceed 12 ms/5, or 2.4 ms; that is, the average queuing delay for the packet at each node should not exceed 2.4 ms. The method illustrated in FIG. 3 will ensure that this maximum delay at each node is not exceeded.

In step 302, at each P hop, a Qmax table, indicating the maximum queuing delay allowed at each hop for each of the destinations, is created. The maximum queuing delay allowed at each hop is determined by taking the maximum end-to-end queuing delay allowed (i.e., maximum end-to-end delay allowed less some amount for propagation and transmission delay (e.g., 3 ms)) and dividing it by the total number of hops along the way for that LSP, as determined in step 300. An exemplary Qmax table for the node PE1 of the network 100 (FIG. 1) is illustrated below in Table I.

TABLE I

Qmax Table

| Destination PE | Maximum Queuing Delay Allowed at Each Hop |
|---|---|
| PE2 | $\Delta_2$ |
| PE3 | $\Delta_3$ |

TABLE I-continued

Qmax Table

| Destination PE | Maximum Queuing Delay Allowed at Each Hop |
|---|---|
| PE4 | $\Delta_4$ |
| PE5 | $\Delta_5$ |

Steps 300 and 302 are performed for each hop only once during LSP setup.

In step 304, a POS table is constructed. The POS table includes two values for every packet entering the ingress queue, including the time the packet entered the queue and the intended destination of the packet. As has been noted, the metro Ethernet switch permits an n-packet look-ahead in its high-priority ingress queue. Table II below illustrates an exemplary POS table.

TABLE II

POS Table

| Queue Position | Time of Packet Entry | Packet Destination |
|---|---|---|
| Position 1 | t1 | PE4 |
| Position 2 | t2 | PE7 |
| Position 3 | t3 | PE12 |
| Position 4 | t4 | PE15 |

The POS table of a node is updated each time a high-priority packet is added to its high-priority ingress queue.

From the Qmax table (Table I) and the POS table (Table II), the maximum queuing delay is allowed for each packet at each node can be determined. In step 306, using the example POS and Qmax tables set forth above, a combined table reflecting this information is created as shown in TABLE III below.

TABLE III

Combined Table

| Position | Time of Entry | Time Packet Must Exit Node to Meet Delay Requirements for Node |
|---|---|---|
| Position 1 | t1 | $t1 + \Delta_4$ |
| Position 2 | t2 | $t2 + \Delta_7$ |
| Position 3 | t3 | $t3 + \Delta_{12}$ |
| Position 4 | t4 | $t4 + \Delta_{15}$ |

In step 308, the packet in whichever position has the lowest, i.e., the first to occur, time in the third column of the combined table at the node is scheduled for transmission. For example, referring to the exemplary combined table set forth above, a determination is made which of the times ($t1+\Delta_4$), ($t2+\Delta_7$), ($t3+\Delta_{12}$), and ($t4+\Delta_{15}$) is the lowest and the packet corresponding thereto is scheduled by the scheduler through a four-packet look-ahead in order to meet the queuing delay constraint at that node. By attempting to meet the delay constraints at each of the intermediate nodes, the total end-to-end delay criterion will be met.

Thereafter, upon receipt of a high-priority packet at the node, in step 309, the POS table and combined table are updated in step 310 and execution returns to step 308.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A method of scheduling high-priority packets in a metro Ethernet switch, the method comprising the steps of:

determining a maximum per-hop queuing delay allowed for at least two high-priority packets in a queue in the switch, wherein the maximum per-hop queuing delay for a particular one of said high-priority packets is a respective maximum per-hop queuing delay calculated dependent upon a number of hops in a label switched path ("LSP") between the switch and a designated destination of the particular one of said high-priority packets and wherein said the respective maximum per-hop queuing delay is calculated only during set-up of the LSP and dependent upon a specified maximum end-to-end delay;

determining which one of the at least two high-priority packets has a smallest node exit delay requirement, wherein a node exit delay requirement for a designated high-priority packet is the sum of the maximum per-hop queuing delay allowed for the designated high-priority packet and a time of entry at the switch for the designated high-priority packet; and scheduling the one of the at least two high-priority packets determined to have the smallest node exit delay requirement before the remaining ones of the at least two high-priority packets.

2. The method of claim 1 wherein the step of determining which one of the at least two high-priority packets has the smallest node exit delay requirement comprises the steps of:

creating a POS table that lists, for each high-priority packet that has entered the switch, a position of the high-priority packet in a queue of the switch, a time the high-priority packet entered the queue, and an intended destination of the high-priority packet;

creating a Qmax table for storing a maximum allowed per-hop queuing delay for each of several possible intended destinations; and using the Qmax table and the POS table to determine a node exit delay requirement for each of the high-priority packets in the queue of the switch.

3. The method of claim 2 wherein the step of creating a Qmax table comprises the steps of, for each label switched path ("LSP") between the switch and one of the possible intended destinations:

determining a number of hops along the LSP; and dividing a maximum queuing delay allowed for the LSP by the number of hops along the LSP to determine the maximum allowed per-hop queuing delay.

4. The method of claim 2 wherein the step of creating a Qmax table is performed only once during LSP setup.

5. The method of claim 2 further comprising the step of updating the POS table each time a new high-priority packet enters the queue.

6. The method of claim 1 wherein the steps of determining a maximum per-hop queuing delay allowed, determining which one of the at least two high-priority packets has the smallest node exit delay requirement, and scheduling the one of the at least two high-priority packets determined to have the smallest node exit delay requirement before the remaining ones of the at least two high-priority packets are performed each time a new high-priority packet enters the queue.

7. The method of claim 1 wherein the queue is capable of performing an n-packet look-ahead.

8. A method of scheduling high-priority packets in a metro Ethernet switch, the method comprising the steps of:
creating a first table that lists, for each high-priority packet that has entered the switch, a position of the high-priority packet in a queue of the switch, a time the high-priority packet entered the queue, and an intended destination of the high-priority packet;
creating a second table for storing a maximum allowed per-hop queuing delay for each of several possible intended destinations, wherein the maximum per-hop queuing delay for a particular one of said intended destinations is a respective maximum per-hop queuing delay calculated dependent upon a number of hops in a label switched path ("LSP") between the switch and the particular one of said intended destination and wherein the respective maximum per-hop queuing delay is calculated only during set-up of the LSP and dependent upon a specified maximum end-to-end delay; and
using the first and second tables to determine a node exit delay requirement for each of the high-priority packets in the queue of the switch, wherein a node exit delay requirement for a designated high-priority packet is the sum of the maximum allowed per-hop queuing delay for the designated high-priority packet and a time of entry at the switch for the designated high-priority packet.

9. The method of claim 8 further comprising the step of:
determining a maximum per-hop queuing delay allowed for at least two high-priority packets in a queue in the switch, wherein the maximum per-hop queuing delay for a particular one of said high-priority packets is a respective maximum per-hop queuing delay calculated dependent upon a number of hops in a label switched path ("LSP") between the switch and a designated destination of the particular one of said high-priority packets.

10. The method of claim 9 further comprising the step of:
determining which one of the at least two high-priority packets has smallest node exit delay requirement.

11. The method of claim 10 further comprising the step of:
scheduling the one of the at least two high-priority packets determined to have the smallest node exit delay requirement before the remaining ones of the at least two high-priority packets.

12. The method of claim 8 wherein the step of creating a second table comprises the steps of, for each label switched path ("LSP") between the switch and one of the possible intended destinations:
determining a number of hops along the LSP; and
dividing a maximum queuing delay allowed for the LSP by the number of hops along the LSP to determine the maximum allowed per-hop queuing delay.

13. The method of claim 8 wherein the step of creating a second table is performed only once during LSP setup.

14. The method of claim 8 further comprising the step of updating the first table each time a new high-priority packet enters the queue.

15. The method of claim 8 wherein the queue is capable of performing an n-packet look-ahead.

16. Apparatus for scheduling high-priority packets in a metro Ethernet switch, the apparatus comprising:
means for determining a maximum per-hop queuing delay allowed for at least two high-priority packets in a queue in the switch, wherein the maximum per-hop queuing delay for a particular one of said high-priority packets is a respective maximum per-hop queuing delay calculated dependent upon a number of hops in a label switched path ("LSP") between the switch and a designated destination of the particular one of said high-priority packets and wherein said the respective maximum per-hop queuing delay is calculated only during set-up of the LSP and dependent upon a specified maximum end-to-end delay;
means for determining which one of the at least two high-priority packets has smallest node exit delay requirement, wherein a node exit delay requirement for a designated high-priority packet is the sum of the maximum per-hop queuing delay allowed for the designated high-priority packet and a time of entry at the switch for the designated high-priority packet; and
means for scheduling the one of the at least two high-priority packets determined to have the smallest node exit delay requirement before the remaining ones of the at least two high-priority packets.

17. The apparatus of claim 16 wherein the means for determining which one of the at least two high-priority packets has the smallest node exit delay requirement comprises:
a POS table that lists, for each high-priority packet that has entered the switch, a position of the high-priority packet in a queue of the switch, a time the high-priority packet entered the queue, and an intended destination of the high-priority packet;
means for creating a Qmax table for storing a maximum allowed per-hop queuing delay for each of several possible intended destinations; and
means for using the Qmax table and the POS table to determine a node exit delay requirement for each of the high-priority packets in the queue of the switch.

18. The apparatus of claim 17 wherein the means for creating a Qmax table comprises, for each label switched path ("LSP"):
means for determining a number of hops along the LSP; and
means for dividing a maximum queuing delay allowed for the LSP by the number of hops along the LSP to determine the maximum allowed per-hop queuing delay.

19. The apparatus of claim 17 wherein the Qmax table is created during LSP setup.

20. The apparatus of claim 17 further comprising means for updating the POS table each time a new high-priority packet enters the queue.

21. The apparatus of claim 16 wherein the queue is capable of performing an n-packet look-ahead.

22. A packet switch comprising:
a queue containing a plurality of packets received at the switch; and
a scheduler for scheduling transmission of the packets in the queue, wherein when the queue contains at least two high-priority packets, the scheduler schedules the one of the at least two high-priority packets determined to have a smallest node exit delay requirement before the remaining ones of the at least two high-priority packets, wherein a node exit delay requirement for a designated high-priority packet is the sum of a maximum per-hop queuing delay allowed for the designated high-priority packet and a time of entry at the switch for the designated high-priority packet, wherein the maximum per-hop queuing delay for a particular one of said high-priority packets is a respective maximum per-hop queuing delay calculated dependent upon a number of hops in a label switched path ("LSP") between the switch and a designated destination of the particular one of said high-priority packets and wherein said the respective maximum per-hop queuing delay is calculated only during set-up of the LSP and dependent upon a specified maximum end-to-end delay.

23. The packet switch of claim 22 further comprising a state machine for:
   maintaining a POS table that lists, for each high-priority packet that has entered the switch, a position of the high-priority packet in a queue of the switch, a time the high-priority packet entered the queue, and an intended destination of the high-priority packet; and
   maintaining a Qmax table for storing a maximum allowed per-hop queuing delay for each of several possible intended destinations.

24. The packet switch of claim 23 wherein the scheduler uses the Qmax table and the POS table to determine the node exit delay requirement for each of the high-priority packets in the queue of the switch.

25. The packet switch of claim 23 wherein the maximum allowed per-hop queuing delay for each of several possible intended destinations is determined by determining a number of hops along the LSP and dividing a maximum queuing delay allowed for the LSP by the number of hops along the LSP to determine the maximum allowed per-hop queuing delay.

* * * * *